US012585474B2

(12) United States Patent
Hopkins et al.

(10) Patent No.: US 12,585,474 B2
(45) Date of Patent: Mar. 24, 2026

(54) BOOT PROCESS WITH CORE ISOLATION

(71) Applicant: International Business Machines Corporation, Armonk, NY (US)

(72) Inventors: Luke Hopkins, Peterborough, NH (US); Michael James Becht, Poughkeepsie, NY (US); Ying-Yeung Li, Pleasant Valley, NY (US); Clinton E. Bubb, Milton, NY (US)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 18/601,520

(22) Filed: Mar. 11, 2024

(65) Prior Publication Data

US 2025/0284501 A1      Sep. 11, 2025

(51) Int. Cl.
G06F 9/4401          (2018.01)
(52) U.S. Cl.
CPC .................................. G06F 9/4405 (2013.01)
(58) Field of Classification Search
CPC .................................................... G06F 9/4405
See application file for complete search history.

(56) References Cited

U.S. PATENT DOCUMENTS

| | | | |
|---|---|---|---|
| 10,248,485 B2 | 4/2019 | Aleman et al. | |
| 11,809,875 B2 | 11/2023 | Suryanarayana et al. | |
| 11,895,244 B2 | 2/2024 | Liu et al. | |
| 11,899,549 B2 | 2/2024 | Straw et al. | |
| 2015/0067310 A1 | 3/2015 | Henry et al. | |
| 2015/0178094 A1* | 6/2015 | Kwon ................... | G06F 9/4405 |
| | | | 713/2 |
| 2016/0004542 A1* | 1/2016 | Das ....................... | G06F 9/4405 |
| | | | 713/2 |
| 2021/0312053 A1* | 10/2021 | Kloth ................... | H04L 9/0861 |

FOREIGN PATENT DOCUMENTS

WO          2025/190655 A1      9/2025

OTHER PUBLICATIONS

International Searching Authority, "Notification of Transmittal of the International Search Report and the Written Opinion of the International Searching Authority, or Declaration," Patent Cooperation Treaty Apr. 22, 2025, 10 pages, International Application No. PCT/EP2025/055068.

* cited by examiner

*Primary Examiner* — Phil K Nguyen
*Assistant Examiner* — Ayman Fatima
(74) *Attorney, Agent, or Firm* — Patterson + Sheridan, LLP

(57)          ABSTRACT

The embodiments herein describe techniques for implementing enhanced boot processing of an embedded compute complex including a plurality of cores. Disclosed embodiments enable isolating the plurality of cores of the embedded compute complex from other components of a computing system when the cores are released from reset at the beginning of the boot initialization sequence, and enable a hierarchical boot process for booting the plurality of cores of the embedded compute complex.

20 Claims, 5 Drawing Sheets

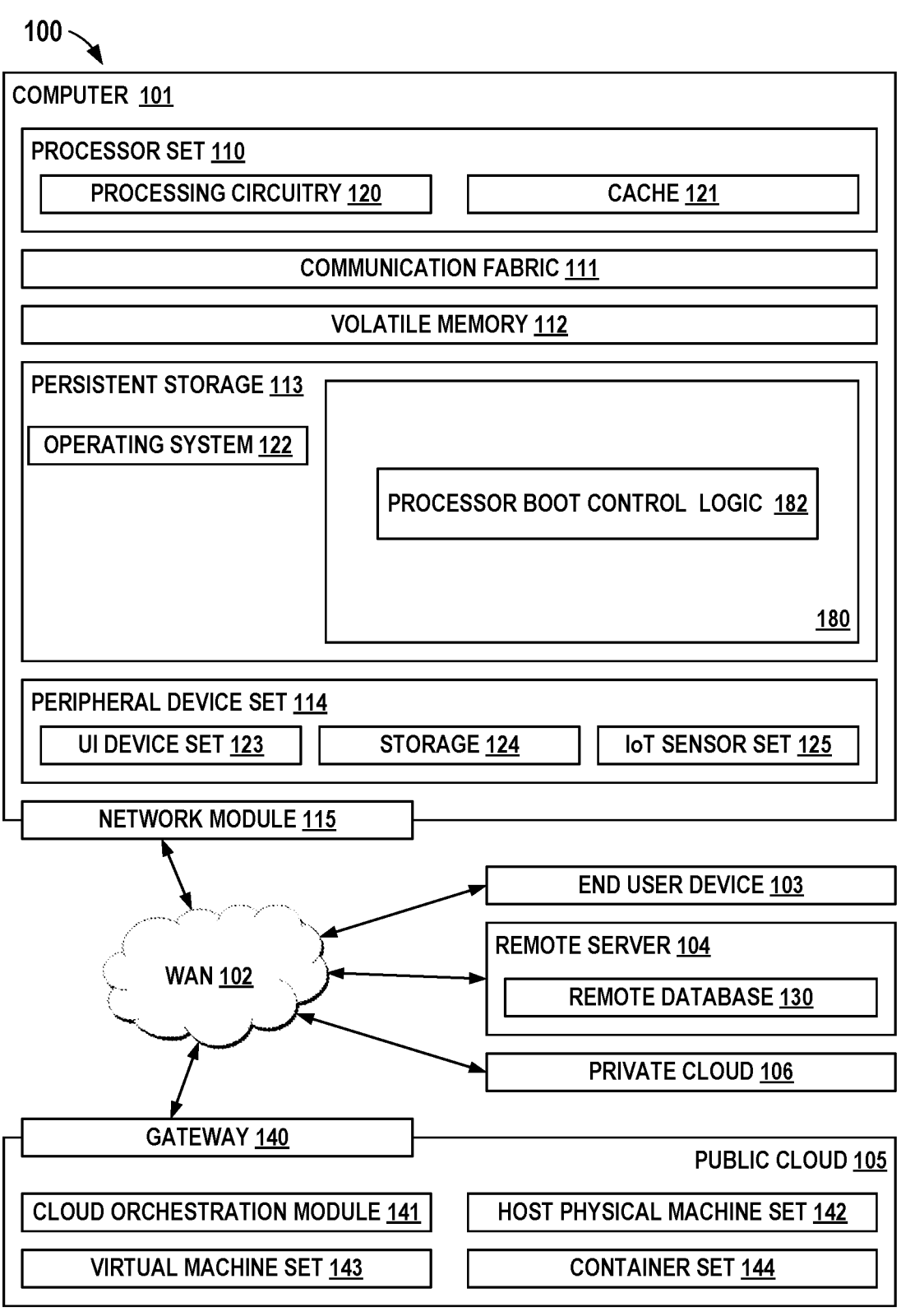

100

COMPUTER 101

PROCESSOR SET 110

PROCESSING CIRCUITRY 120     CACHE 121

COMMUNICATION FABRIC 111

VOLATILE MEMORY 112

PERSISTENT STORAGE 113

OPERATING SYSTEM 122

PROCESSOR BOOT CONTROL LOGIC 182

180

PERIPHERAL DEVICE SET 114

UI DEVICE SET 123     STORAGE 124     IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141     HOST PHYSICAL MACHINE SET 142

VIRTUAL MACHINE SET 143     CONTAINER SET 144

FIG. 1

400

Configure an acquire fence associated with each of a plurality of cores in an embedded compute complex, where the acquire fence is a hardware function, and is set to prevent the plurality of cores from fetching code instructions based on a release from reset state, and the acquire fence is released in response to memory being accessible, (e.g., the set and release of the acquire fence is processor driven through a system interconnect) — 402

Configure a boot message register associated with each of the plurality of cores in an embedded compute complex — 404

Drive the acquire fence and the boot message register, e.g., implemented through one or more processors controlling a boot process of the embedded compute complex — 406

Enable a maintenance core for boot-strap sequence process to permit the maintenance core of the plurality of cores in the embedded compute complex to control the boot process — 408

Boot, except for the maintenance core, the plurality of cores in an embedded compute complex to a spin loop — 410

Monitor, by the plurality of spinning cores, an associated boot message register, where the boot message register is set to an associated address for a given core by the maintenance core — 412

In response to the boot message register being written, (e.g., by the maintenance core through the system interconnect), permit access to the given core to the associated address and contents of the boot message register to branch to an addressed location, and start executing code instructions — 414

FIG. 4

BOOT PROCESS WITH CORE ISOLATION

BACKGROUND

The present invention relates to data processing systems, and more specifically, to methods and systems for implementing boot process with core isolation of an embedded compute complex in a computing system.

Data processing systems may include multiple, sometimes relatively large amount of, physical hardware (e.g., processors, (e.g., central processing unit (CPU) subsystems with each CPU subsystem including a plurality of cores of an embedded compute complex), memory, storage, I/O, and combinations thereof) to perform different types of workloads (e.g., batch processing, transaction processing, and the like). For example, large data processing systems, such as mainframe computers, may include multiple clusters of processors, memory, and other hardware. Multiple processor computing systems can enable enhanced computing performance, while technical challenges remain, for example, for implementing an enhanced boot process for a plurality of cores of embedded compute complexes.

SUMMARY

According to one embodiment of the present disclosure, a non-limiting computer implemented method is provided. The method comprises setting an acquire fence, by one or more processors controlling a boot process, at a start of the boot process of an embedded compute complex, where the acquire fence is set to prevent a plurality of cores in the embedded compute complex from fetching code instructions. The method comprises monitoring, by the plurality of cores, a boot message register associated with the plurality of cores; releasing, by the one or more processors controlling the boot process, the acquire fence in response to enabling system memory in the boot process; and accessing an address written in the boot message register by one core of the plurality of cores, to boot the one core to the address and start code execution with the one core.

According to one embodiment of the present disclosure, a system is provided. The system includes one or more computer processors, and a memory containing a program which when executed by the one or more computer processors performs an operation. The operation comprises setting an acquire fence, by one or more processors controlling a boot process, at a start of the boot process of an embedded compute complex, where the acquire fence is set to prevent a plurality of cores in the embedded compute complex from fetching code instructions. The operation comprises monitoring, by the plurality of cores, a boot message register associated with the plurality of cores; releasing, by the one or more processors controlling the boot process, the acquire fence in response to enabling system memory in the boot process; and accessing an address written in the boot message register by one core of the plurality of cores, to boot the one core to the address and start code execution with the one core.

According to one embodiment of the present disclosure, a computer program product is provided. The computer program product includes a computer-readable storage medium having computer-readable program code embodied therewith, the computer-readable program code executable by one or more computer processors to perform an operation. The operation comprises setting an acquire fence, by one or more processors controlling a boot process, at a start of the boot process of an embedded compute complex, where the acquire fence is set to prevent a plurality of cores in the embedded compute complex from fetching code instructions. The operation comprises monitoring, by the plurality of cores, a boot message register associated with the plurality of cores; releasing, by the one or more processors controlling the boot process, the acquire fence in response to enabling system memory in the boot process; and accessing an address written in the boot message register by one core of the plurality of cores, to boot the one core to the address and start code execution with the one core.

BRIEF DESCRIPTION OF THE DRAWINGS

FIG. 1 is a block diagram of an example computer environment for use in conjunction with one or more disclosed embodiments;

FIG. 4 is a flowchart illustrating example operations of a method for implementing boot control functions of one or more embodiments of the present disclosure.

DETAILED DESCRIPTION

Figure 2:
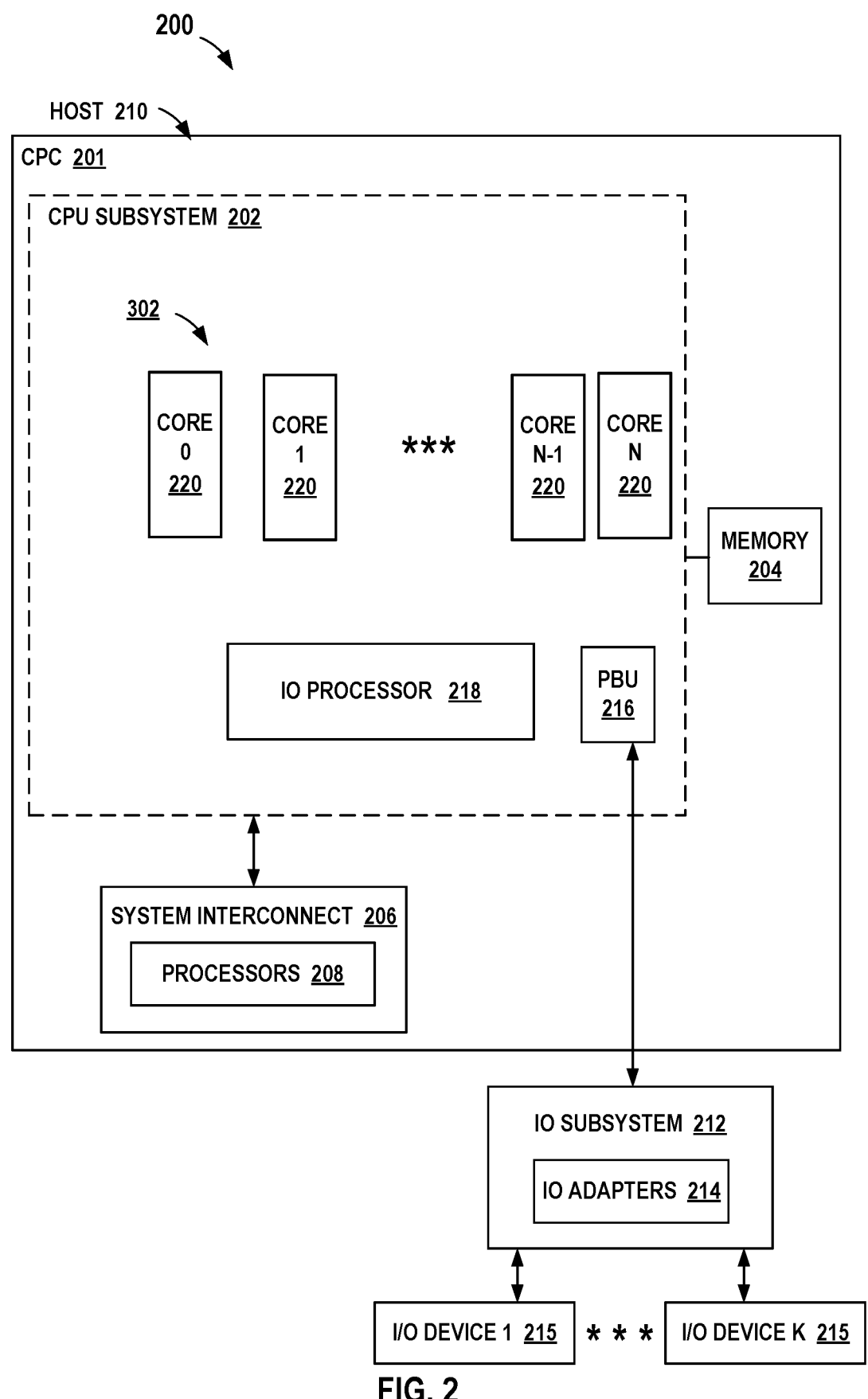
FIG. 2 is a block diagram of an example computing system for implementing boot control functions of one or more embodiments of the present disclosure.

The embodiments herein describe techniques for implementing boot control of a plurality of cores of an embedded compute complex. Embodiments of the present disclosure enable isolating the plurality of cores within the embedded compute complex from other components of a computing system that includes the embedded compute complex, when the cores are released from reset at the beginning of a boot initialization sequence. Disclosed embodiments enable the plurality of cores of the embedded compute complex to boot from unique areas to execute different types of code of different protocols with a common boot sequence.

According to an aspect of disclosed embodiments, a non-limiting computer implemented method is provided. The computer-implemented method comprises setting an acquire fence, by one or more processors controlling a boot process, at a start of the boot process of an embedded compute complex, where the acquire fence is set to prevent a plurality of cores in the embedded compute complex from fetching code instructions. The method comprises monitoring, by the plurality of cores, a boot message register associated with the plurality of cores; releasing, by the one or more processors controlling the boot process, the acquire fence in response to enabling system memory in the boot process; and accessing an address written in the boot message register by one core of the plurality of cores, to boot the one core to the address and start code execution with the one core.

According to an aspect of disclosed embodiments, a system is provided. The system includes one or more computer processors, and a memory containing a program which when executed by the one or more computer processors performs an operation. The operation comprises setting an acquire fence, by one or more processors controlling a boot process, at a start of the boot process of an embedded compute complex, where the acquire fence is set to prevent a plurality of cores in the embedded compute complex from fetching code instructions. The operation comprises monitoring, by the plurality of cores, a boot message register associated with the plurality of cores; releasing, by the one or more processors controlling the boot process, the acquire fence in response to enabling system memory in the boot process; and accessing an address written in the boot message register by one core of the plurality of cores, to boot the one core to the address and start code execution with the one core. The system enables enhanced boot processing of the plurality of cores of the embedded compute complex to boot from unique areas and execute different types of code of different protocols with a common boot sequence.

According an aspect of disclosed embodiments, a computer program product is provided. The computer program product includes a computer-readable storage medium having computer-readable program code embodied therewith, the computer-readable program code executable by one or more computer processors to perform an operation. The operation comprises setting an acquire fence, by one or more processors controlling a boot process, at a start of the boot process of an embedded compute complex, where the acquire fence is set to prevent a plurality of cores in the embedded compute complex from fetching code instructions. The operation comprises monitoring, by the plurality of cores, a boot message register associated with the plurality of cores; releasing, by the one or more processors controlling the boot process, the acquire fence in response to enabling system memory in the boot process; and accessing an address written in the boot message register by one core of the plurality of cores, to boot the one core to the address and start code execution with the one core. The computer program product enables enhanced boot processing of the plurality of cores of the embedded compute complex to boot from unique areas and execute different types of code of different protocols with a common boot sequence.

Additionally, an embodiment of the present disclosure further comprises enabling a maintenance core for controlling the boot process, and booting the plurality of cores, except of the maintenance core, to a spin loop. The embodiment provides a maintenance core that enables reduced hardware and power consumption for the boot process.

Additionally, for an embodiment of the present disclosure the enabling the maintenance core further comprises monitoring, by the plurality of cores in the spin loop, the boot message register associated with the plurality of cores, wherein the boot message register is written with an associated boot address for the one core of the plurality of cores by the maintenance core. The embodiment provides a maintenance core that enables reduced hardware and power consumption for the boot process.

Additionally, for an embodiment of the present disclosure the enabling the maintenance core further comprises in response to the boot message register being written, permitting access to the associated boot address and contents of the boot message register to the one core to boot the one core to an addressed location, and start code execution. The embodiment provides a maintenance core that enables reduced hardware and power consumption for the boot process.

Additionally, for another embodiment of the present disclosure the acquire fence is a hardware function of the embedded compute complex. The embodiment provides a hardware acquire fence that enables efficient and effective boot processing with reduced hardware and power consumption for the boot process.

Additionally, for another embodiment of the present disclosure the boot message register associated with the plurality of cores is a hardware register function of the embedded compute complex. The embodiment provides a hardware boot message register that enables enhanced boot processing of the plurality of cores of the embedded compute complex to boot from unique areas and execute different types of code of different protocols with a common boot sequence.

Additionally, for another embodiment of the present disclosure the plurality of cores are hardware execution units of the embedded compute complex. The embodiment enables enhanced boot processing of the plurality of cores, which enable the hardware execution units to efficiently boot from unique areas and execute different types of code of different protocols with a common boot sequence.

Additionally, for another embodiment of the present disclosure the boot process of the embedded compute complex is a hierarchical boot process for booting the plurality of cores of the embedded compute complex. The embodiment enables enhanced boot processing of the plurality of cores to efficiently boot from unique areas and execute different types of code of different protocols with a common boot sequence.

Additionally, for another embodiment of the present disclosure the one or more processors controlling the boot process identifying the address written in the boot message register associated with the one core during the boot process after the start of the boot process of the embedded compute complex. The embodiment enables enhanced boot processing of the plurality of cores to efficiently boot from unique areas and execute different types of code of different protocols with a common boot sequence.

Additionally, for another embodiment of the present disclosure the embedded compute complex comprises a central processing unit (CPU) subsystem, and wherein the plurality of cores are hardware execution units of the embedded compute complex. The embodiment enables enhanced boot processing of the plurality of cores to efficiently boot to start code execution.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention"

shall not be construed as a generalization of any inventive subject matter disclosed herein and shall not be considered to be an element or limitation of the appended claims except where explicitly recited in a claim(s).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, a computing environment 100 contains an example of an environment for the execution of at least some of the computer code involved in performing the inventive methods, such as a Core Boot Control Logic 182, at block 180. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 illustrates an example computing system 200 for implementing boot control functions of one or more embodiments of the present disclosure. System 200 can be used in conjunction with the Core Boot Control Logic 182, the computer 101 and cloud environment of the computing environment 100 of FIG. 1 of disclosed embodiments.

In an embodiment, the computing system 200 may include multiple nodes comprising at least one node host 210, which includes, without limitation, a central processing complex (CPC) 201. The CPC 201 comprises one or more central processing unit (CPU) subsystems 202 (one shown), a memory 204, which may include volatile memory and/or persistent storage, and a system interconnect 206, which may include one or more processors 208, used with a boot process of disclosed embodiments. The CPC 201, the CPU subsystem 202, and memory 204 are communicatively coupled via the system interconnect 206 and the one or more processors 208. The host 210 may be implemented by a computer, a mainframe computer, a server or a server computer system, such as an IBM Z System Server offered by International Business Machines Corporation.

In an embodiment, the CPC 201 is communicatively coupled with an input/output (IO) subsystem 212, which includes one or multiple IO adapters 214. The plurality of IO adapters 214 connect the computing system 200 with one or more I/O devices 215 1-K, examples of which may include storage devices, network interface cards (NICs) (also known as network cards), and printers. In certain embodiments, the CPU subsystem 202 further includes a peripheral component interconnect express (PCIe) bridge unit (PBU) 216 that is communicatively coupled with an IO processor 218 of the CPU subsystem 202 and with the I/O subsystem 212.

The CPU subsystem 202 comprises an embedded compute complex 302, which includes a plurality of processor cores 220 1-N having any suitable implementation. For example, additional hardware functions of the embedded compute complex 302 are illustrated and described with respect to FIG. 3. The plurality of processor cores 220 1-N are hardware execution units, also called hardware compute units.

System 200 enables enhanced boot processes for the plurality of cores 220 1-N of the embedded compute complex 302 or more disclosed embodiments. For example, a disclosed embodiment enables isolating the plurality of processor cores 220 1-N in the embedded compute complex 302 from the rest of host 210 when the cores are released from reset at the beginning of the boot initialization sequence. Disclosed embodiments enable the plurality of cores 220 1-N of the embedded compute complex 302 to boot from unique areas to execute different types of code of different protocols with a common boot sequence. The plurality of cores 220 1-N of the embedded compute complex 302 can execute specific code and protocols, for example, of other host nodes, or of specific types of the I/O device 215 1-K such as, a Fibre Channel (FC) storage array, a NIC, of a printer.

In an embodiment, the plurality of processor cores 220 1-N are isolated from other components of the host 210 at a beginning of a boot initialization sequence of system 200. When the host 210 is powered up, the CPU subsystem 202 and the embedded compute complex 302 enter a reset state, a boot process of the embedded compute complex 302 utilizes additional hardware functions of the embedded compute complex 302 illustrated and described with respect to FIG. 3 for isolating the plurality of processor cores 220 1-N of disclosed embodiments.

The architecture of the computing system 200, and more specifically the use of the I/O processor 218 within the CPU subsystem 202, provides a number of benefits. In general terms, the computing system 200 provides a more efficient operation reflecting updates to the architecture of the CPC 201. For instance, providing the I/O processor 218 within the CPC 201 shortens a path length from the processor cores 220 1-N to the I/O functionality, supporting greater throughput and responsiveness. The I/O processor 218 may be reconfigured and therefore adaptable to new types of communication links used by the I/O subsystem 212. Additionally, use of the I/O processor 218 allows new types of I/O adapters 214 to be integrated into the computing system 200 without requiring development of custom interface hardware in the I/O subsystem 212 (e.g., implemented using a unique ASIC and I/O card). In this way, the overall cost of the computing system 200 and/or its power consumption may be reduced.

Figure 3:
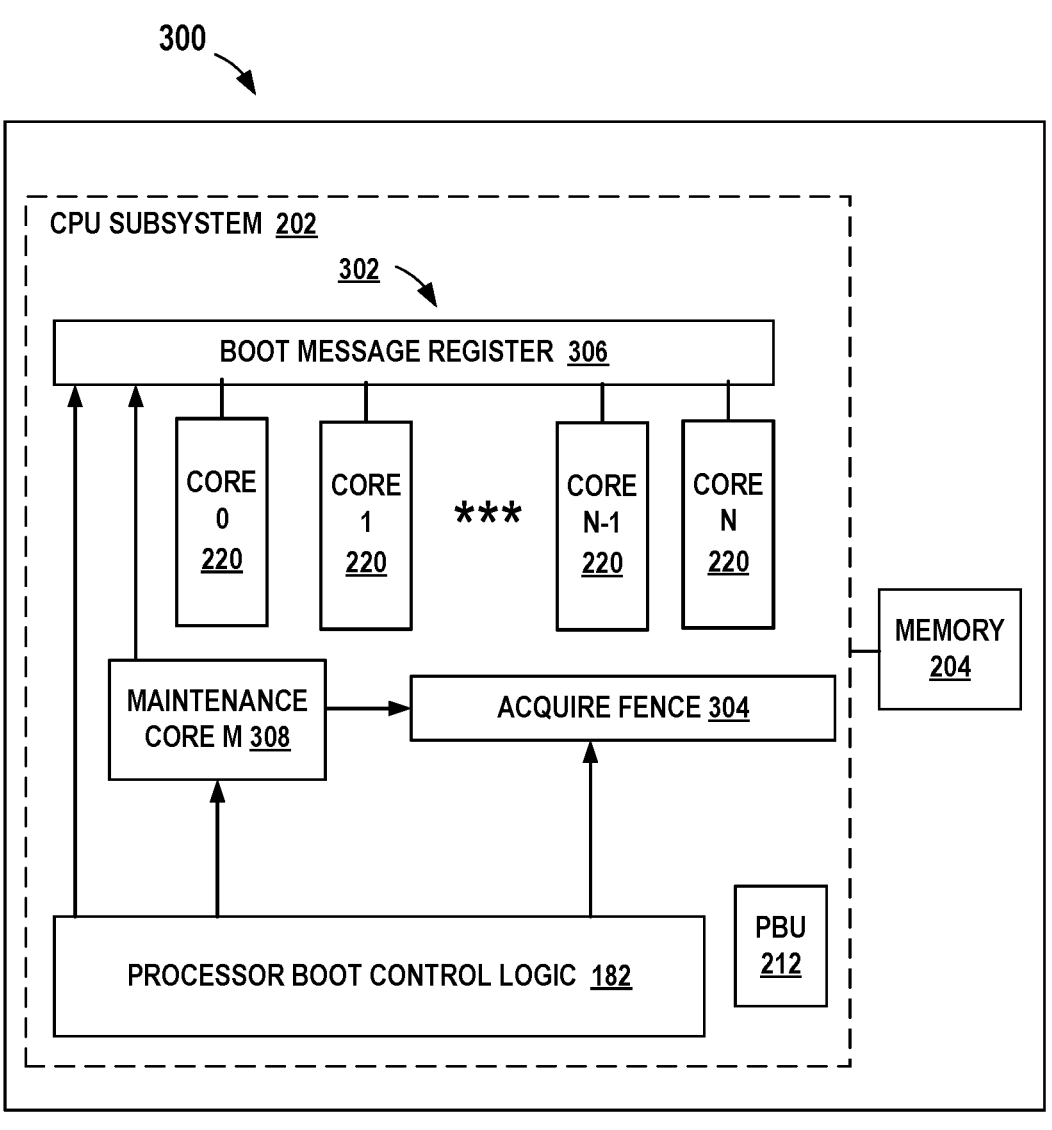
FIG. 3 is a block diagram further illustrating details of an embedded compute complex system of the computing system of FIG. 2 of one or more embodiments of the present disclosure.

Referring now to diagram 300 of FIG. 3, there are shown further details of additional novel hardware functions of an embedded compute complex 302 of the computing system 200, according to one or more disclosed embodiments. The hardware functions of embedded compute complex 302 enable implementing an enhanced boot process of disclosed embodiments. As shown, the additional hardware functions include an acquire fence 304 and a boot message register 306. As shown, the embedded compute complex 302 of CPU subsystem 202 further includes one of the processor cores 220 1-N, configured as a control processor, or a maintenance core M 308 for implementing an enhanced boot process of disclosed embodiments.

In an embodiment, the acquire fence 304, when set, prevents the respective associated cores 220 1-N from fetching code instructions. The boot message register 306 and the acquire fence 304 are accessible through the system interconnect 206 and are driven by a boot controller or boot processor, such as the one or more processors 208 and/or the maintenance core M 308, controlling the boot of the computing system 200 and the embedded CPU subsystem 202. Initially, the plurality of cores 220 1-N are fenced from access requests by the acquire fence 304 of the CPU subsystem 202 when the acquire fence 304 is set. The plurality of cores 220 1-N is isolated within embedded compute complex 302 (e.g., isolated from certain other components of the host 210 shown in FIG. 2) when the cores are released from reset at a start of the boot initialization sequence. In an embodiment, a system fence (not shown) is lowered to permit access to memory 204 when subsystem cache memories (not shown) associated with the plurality of cores 220 1-N are cleared or initialized and memory 204 is accessible. The acquire fence 304 is released and each respective core 220 is allowed to boot, branching to an address location specified in its boot vector written in the boot message register 306 when subsystem memories and memory 204 are accessible. In an embodiment, the respective cores 220 are allowed to boot (e.g., based on an address location and message content written to the boot message register 306) during the boot sequence following initialization of the subsystem memories and memory 204 to permit memory access to the system memory 204.

In an embodiment, to allow for a boot-strap sequence which permits a main part of the boot process to be controlled by the maintenance processor core M 308 in the embedded system itself, each core 220 1-N can be booted to a spin loop except for the maintenance processor core M 308. The spinning cores 220 1-N monitor the boot message register 306. The boot message register 306 is set to an actual boot address by the maintenance processor core M 308. When the actual boot address is written by the maintenance processor core M 308 through the interconnect for each core 220 1-N, the respective associated core 220 takes the contents of the boot message register 306, branches to the addressed location, and can start executing code instructions. In the boot sequence of disclosed embodiments, the acquire fence 304, and boot message register 306 enable a hierarchical boot process, where the initial boot orchestrators, (e.g., processors 208 of system interconnect 206 of FIG. 2) are not required to know the final boot address of the plurality of cores 220 1-N at the start of the boot process. In the hierarchical boot process, an address and message content are written in an associated boot message register for the given core at a variable time in the boot sequence, which is accessed by the given core to start code execution.

Figure 5:
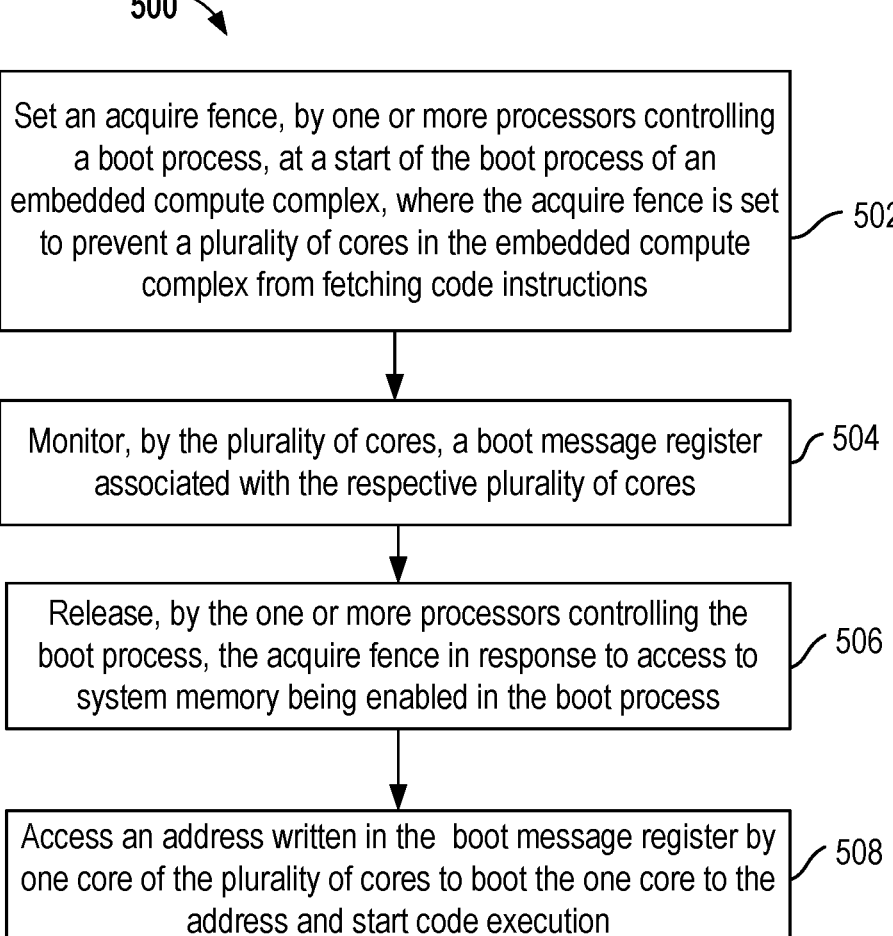
FIG. 5 is a flowchart illustrating example features and operations of a method for implementing boot control functions of one or more embodiments of the present disclosure.

FIG. 4 illustrates example operations of a method 400 for implementing enhanced core boot processes and control functions of one or more disclosed embodiments. Method 400 and method 500 can be implemented by system 200 including the embedded compute complex 302 with the plurality of cores 220 1-N of CPU subsystem 202 in conjunction with the Core Boot Control Logic 182, the computer 101 and cloud environment of the computing environment 100 of FIG. 1 of disclosed embodiments. In FIGS. 4, and 5, the same reference numbers are used for identical or similar components as used in FIG. 2.

As shown at block 402, system 200 configures an acquire fence 304 associated with each of the plurality of cores 220 1-N of the embedded compute complex 302 of CPU subsystem 202 disclosed embodiments. In one embodiment, the acquire fence 304 is a hardware function that is set to prevent the plurality of cores 220 1-N from fetching code instructions. The acquire fence 304 is set at the beginning of the boot initialization sequence when the plurality of cores are released from a reset. The acquire fence 304 is released in response to memory being accessible, for example the set and release of acquire fence 304 is processor driven through processors 208 of the system interconnect 206.

At block 404, system 200 configures a boot message register 306, which is a hardware function that is associated with each of the plurality of cores 220 1-N of the embedded compute complex 302 of disclosed embodiments. For example, the boot message register 306 can be configured with predefined bit ranges corresponding to the plurality of cores 220 1-N to receive an address and boot message. At block 406, system 200 (e.g., implemented through the one or more processors 208) drives the acquire fence 304 and the boot message register 306 accessible through the system interconnect, to control a boot process of the embedded compute complex 302.

At block 408, system 200 enables a boot process of the plurality of cores 220 1-N of the embedded compute complex 302 (e.g., a boot-strap sequence) implemented through the enabled control core or maintenance core M 308. In an embodiment, for example the maintenance core 308 M controls the boot process of the other cores 220 1-N of the embedded compute complex 302. In an embodiment, at a beginning of a boot sequence the embedded system 302 enters a reset state, the reset state is released with the acquire fence 304 being set. For example, in an embodiment, the acquire fence is set, which is driven by the maintenance core M 308. In an embodiment, the plurality of cores 220 1-N are released from the reset state and the cores are isolated within the embedded compute complex 302 from the host system 210 with the acquire fence 304, as described with respect to blocks 402 and 406. At block 410, system 200 (e.g., using the maintenance core 308 M) boots the plurality of cores 220 1-N to a spin loop, except for the maintenance core M 308. In an embodiment, the plurality of cores 220 1-N see a busy interface state for accessing code in the spin loop. In the spin loop, the plurality of spinning cores 220 1-N are prevented from fetching code instructions by the acquire fence 304.

At block 412, system 200 (e.g., using the plurality of spinning cores 220 1-N), monitors the boot message register 306 to identify an associated address being written for one or more of the plurality of cores 220 1-N(e.g., when the cores 220 1-N are in the spin loop). In an embodiment, the boot message register 306 is written, or set to an associated address for a given spinning core by the maintenance core M 308. At block 414, system 200, in response to the boot message register being written, (e.g., by the maintenance core M 308 through input of one or more system interconnect processor 208) permits an associated core in the spin mode to access the associated address and contents of the boot message register 306. The one associated core 220 of the plurality of cores 220 1-N boots (i.e., branches) to the addressed location and start executing code instructions. Each of the plurality of cores 220 1-N in the spin mode can boot to a specific addressed location (e.g., at any time during the boot process when an associated address is written for the specific core) and start executing code instructions. In disclosed embodiments, the boot process is a hierarchical boot process where the plurality of cores 220 1-N boot at various times with an associated boot message register being written by the maintenance core 308 M, according to disclosed embodiments.

FIG. 5 illustrates example features and operations of a method 500 for implementing boot control functions of one or more embodiments of the present disclosure. Method 500 can be implemented by system 200 in conjunction with the Core Boot Control Logic 182, the computer 101 and cloud environment of the computing environment 100 of FIG. 1 of disclosed embodiments.

At block 502, an acquire fence 304 is set, by one or more processors controlling a boot process, at a start of the boot process of an embedded compute complex 302, where the acquire fence is set to prevent a plurality of cores 220 1-N in the embedded compute complex from fetching code instructions.

At block 504, the plurality of cores monitor a boot message register associated with the plurality of cores. At block 506, the acquire fence is released, by one or more processors controlling a boot process, in response to access to system memory being enabled in the boot process. For example, in an embodiment, the acquire fence is released by the maintenance core M 308, after system memory is initialized in the boot process, and system 200 permits access to the system memory 204. At block 508, one core of the plurality of cores 220 1-N accesses an address written in the boot message register 306 to boot the one core to the address and start code execution. For example, the one core of the plurality of cores 220 1-N takes the contents of the boot message register 306, branches to the addressed location, starts executing code and operates in a functional state, completing its boot process for the given core.

While the foregoing is directed to embodiments of the present invention, other and further embodiments of the invention may be devised without departing from the basic scope thereof, and the scope thereof is determined by the claims that follow.

What is claimed is:

1. A method comprising:
   setting an acquire fence, by one or more processors of a system interconnect controlling a boot process, at a start of the boot process of an embedded compute complex, where the acquire fence is set to prevent a plurality of cores in the embedded compute complex from fetching code instructions;
   providing a boot message register associated with the plurality of cores;
   writing, after a start of the boot process, boot addresses to the boot message register using a maintenance core of the plurality of cores;
   monitoring, by the plurality of cores except of the maintenance core, the boot message register associated with the plurality of cores during the boot process;
   releasing, by the one or more processors, the acquire fence in response to enabling access to system memory during the boot process; and
   accessing the boot address written in the boot message register by one core of the plurality of cores to boot the one core to the boot address and start code execution with the one core.

2. The method of claim 1, wherein the embedded compute complex and the memory are communicatively coupled via the system interconnect, wherein the maintenance core is a control core of the plurality of cores for controlling the boot process in the embedded compute complex, and further comprising:
   booting the plurality of cores, except of the maintenance core, to a spin loop.

3. The method of claim 2, further comprises monitoring, by the plurality of cores in the spin loop, the boot message register associated with the plurality of cores, wherein the boot message register is written with an associated boot address for the one core of the plurality of cores by the maintenance core.

4. The method of claim 3, further comprises, in response to the boot message register being written, permitting access to the associated boot address and contents of the boot message register to the one core to boot the one core to an addressed location, and start code execution.

5. The method of claim 1, wherein the acquire fence is a hardware function of the embedded compute complex.

6. The method of claim 1, wherein the boot message register associated with the plurality of cores is a hardware register function of the embedded compute complex.

7. The method of claim 1, wherein the plurality of cores are hardware execution units of the embedded compute complex.

8. The method of claim 1, wherein the boot process of the embedded compute complex is a hierarchical boot process for booting the plurality of cores of the embedded compute complex.

9. The method of claim 8, further comprises the one or more processors controlling the boot process identifying the address written in the boot message register during the boot process after the start of the boot process of the embedded compute complex.

10. The method of claim 1, wherein the embedded compute complex comprises a central processing unit (CPU) subsystem, and wherein the plurality of cores are hardware execution units of the embedded compute complex.

11. A system, comprising one or more computer processors; and a memory containing a program which when executed by the one or more computer processors performs an operation, the operation comprising:
   setting an acquire fence, by one or more processors of a system interconnect controlling a boot process, at a start of the boot process of an embedded compute complex, where the acquire fence is set to prevent a plurality of cores in the embedded compute complex from fetching code instructions;
   providing a boot message register associated with the plurality of cores;
   writing, after a start of the boot process, boot addresses to the boot message register using a maintenance core of the plurality of cores;
   monitoring, by the plurality of cores except of the maintenance core, the boot message register associated with the plurality of cores during the boot process;
   releasing, by the one or more processors, the acquire fence in response to enabling access to system memory during the boot process; and
   accessing the boot address written in the boot message register by one core of the plurality of cores to boot the one core to the boot address and start code execution with the one core.

12. The system of claim 11, wherein the embedded compute complex and the memory are communicatively coupled via the system interconnect, wherein the maintenance core is a control core of the plurality of cores for controlling the boot process in the embedded compute complex, and further comprising:
   booting the plurality of cores, except of the maintenance core, to a spin loop.

13. The system of claim 12, further comprises monitoring, by the plurality of cores in the spin loop, the boot message register associated with the plurality of cores, wherein the boot message register is written with an associated boot address for the one core of the plurality of cores by the maintenance core.

14. The system of claim 13, further comprises, in response to the boot message register being written, permitting access to the associated boot address and contents of the boot message register to the one core to boot the one core to an addressed location, and start code execution.

15. The system of claim 11, wherein the embedded compute complex comprises a central processing unit (CPU) subsystem, and wherein the plurality of cores are hardware execution units of the embedded compute complex.

16. A computer program product comprising a computer-readable storage medium having computer-readable program code embodied therewith, the computer-readable program code executable by one or more computer processors to perform an operation comprising:

setting an acquire fence, by one or more processors of a system interconnect controlling a boot process, at a start of the boot process of an embedded compute complex, where the acquire fence is set to prevent a plurality of cores in the embedded compute complex from fetching code instructions;

providing a boot message register associated with the plurality of cores;

writing, after a start of the boot process, boot addresses to the boot message register using a maintenance core of the plurality of cores;

monitoring, by the plurality of cores except of the maintenance core, the boot message register associated with the plurality of cores during the boot process;

releasing, by the one or more processors, the acquire fence in response to enabling access to system memory during the boot process; and accessing the boot address written in the boot message register by one core of the plurality of cores to boot the one core to the boot address and start code execution with the one core.

17. The computer program product of claim 16, wherein the embedded compute complex and the memory are communicatively coupled via the system interconnect, wherein the maintenance core is a control core of the plurality of cores for controlling the boot process in the embedded compute complex, and further comprising:

booting the plurality of cores, except of the maintenance core, to a spin loop.

18. The computer program product of claim 17, further comprises monitoring, by the plurality of cores in the spin loop, the boot message register associated with the plurality of cores, wherein the boot message register is written with an associated boot address for the one core of the plurality of cores by the maintenance core.

19. The computer program product of claim 18, further comprises, in response to the boot message register being written, permitting access to the associated boot address and contents of the boot message register to the one core to boot the one core to an addressed location, and start code execution.

20. The computer program product of claim 16, wherein the embedded compute complex comprises a central processing unit (CPU) subsystem, and wherein the plurality of cores are hardware execution units of the embedded compute complex.

* * * * *